(No Model.)
C. S. HAMLIN.
SHEET METAL PIPE.
No. 521,766.  Patented June 19, 1894.
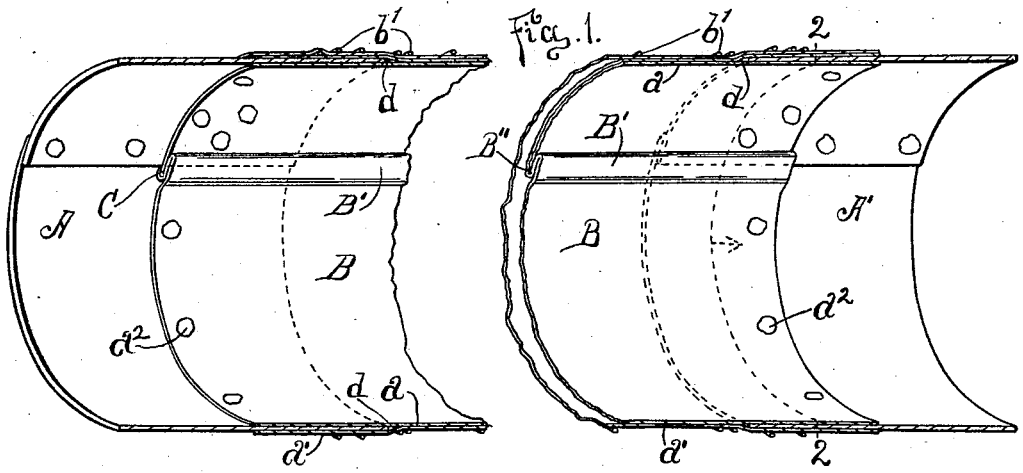
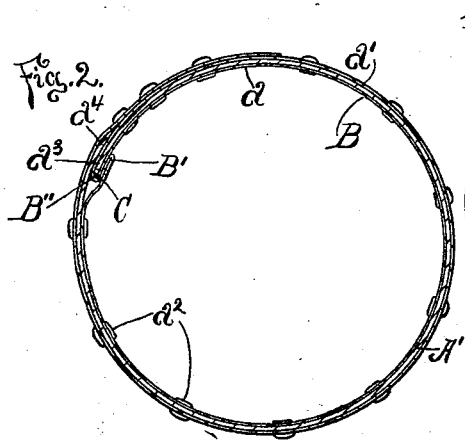
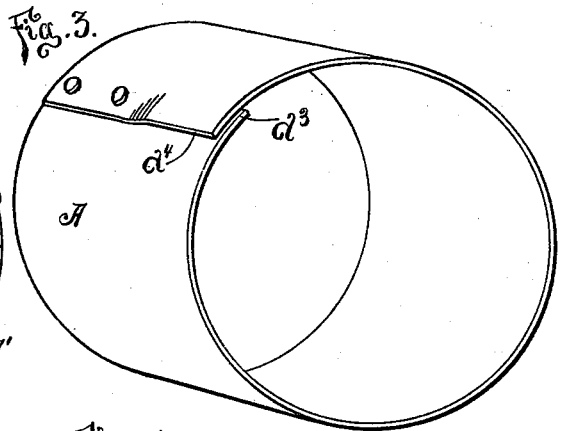
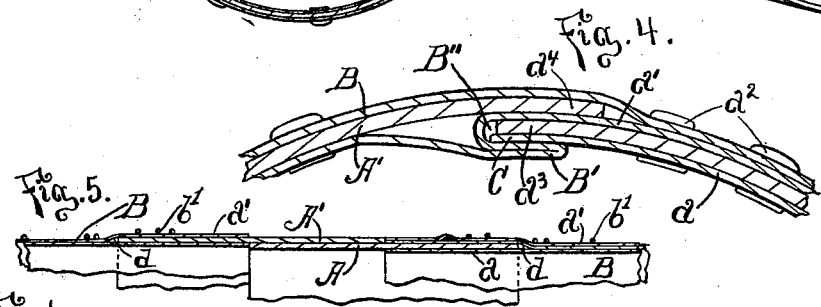
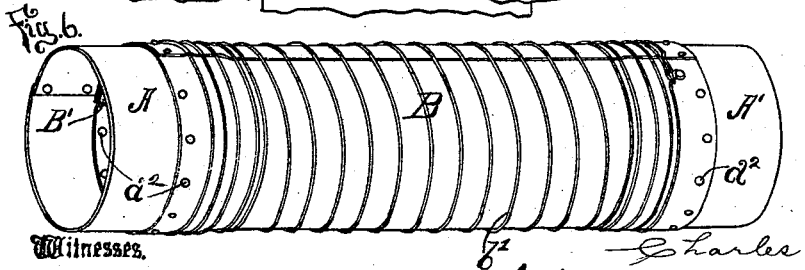
Witnesses.
P. W. Harbeson.
F. M. Townsend.
Inventor.
Charles S. Hamlin
By Hazard & Townsend
His Attys.
THE NATIONAL LITHOGRAPHING COMPANY,
WASHINGTON, D. C.

UNITED STATES PATENT OFFICE.

CHARLES S. HAMLIN, OF LOS ANGELES, ASSIGNOR OF ONE-HALF TO ARTHUR C. HARPER, OF UNIVERSITY, CALIFORNIA.

SHEET-METAL PIPE.

SPECIFICATION forming part of Letters Patent No. 521,766, dated June 19, 1894.

Application filed January 13, 1894. Serial No. 496,770. (No model.)

*To all whom it may concern:*

Be it known that I, CHARLES S. HAMLIN, a citizen of the United States, residing at Los Angeles, in the county of Los Angeles and State of California, have invented new and useful Improvements in Sheet-Metal Pipes, of which the following is a specification.

The object of my invention is to provide sections of light sheet metal pipe which are adapted for the formation of a perfect line of pipe of minimum cost and maximum strength. My invention especially applies to the formation of perfect joints in pipe lines formed of sections of sheet metal pipe.

In manufacturing pipe, the greatest pressure withstanding strength relative to the weight of the pipe is secured by making a convolute of thin sheet metal and wrapping the same with wire and dipping the completed pipe in melted asphalt, maltha, or some other suitable material to close the joints. The difficulty to be overcome with pipes of this character applies particularly to the formation of the joints between the sections of pipe, when such sections are applied together to form the pipe line. My invention is designed to wholly obviate this difficulty and to form a union or joint for pipes of this character which will be especially convenient for laying and will be perfectly strong and tight.

The accompanying drawings illustrate my invention.

Figure 1 is a fragmental longitudinal midsection of a section of pipe made in accordance with my invention. Fig. 2 is a crosssection of the pipe on line indicated by 2—2 Fig. 1 looking toward the right in the direction of the dotted arrow. Fig. 3 is a perspective view of one of the thimbles ready to be applied to the pipe. The nearer end of the thimble as shown in this view is the end which attaches to the body of the pipe. Fig. 4 is an enlarged fragmental sectional detail of a portion of Fig. 2. Fig. 5 is a fragmental longitudinal sectional view showing the ends of two sections united. Fig. 6 is a perspective view of a completed section of the pipe.

My invention comprises a sheet metal pipe having its end or ends A A' made of thicker material than its body B. Its ends A A' as shown comprise thimbles made of sheet metal applied to the sheet metal body and secured thereto by suitable means such as the rivets $a^2$. The body B is preferably made of a convolute of sheet metal held in place by suitable means such as the wire wrapping $b'$. The construction of the body of the pipe particularly illustrated here is not claimed in this application for the reason that it is claimed in my application for Letters-Patent, Serial No. 493,736, filed December 15, 1893. This body is formed of a single sheet of metal designated by the letter B in the drawings, provided between its edges with a longitudinal S-shaped fold or lap $B'$ which forms a seat for one of the edges C of the sheet, said sheet being rolled into convolute form with the edge C of one section $a$ of the sheet inserted in the seat $B''$ formed by the lap and the outer section or leaf $a'$ of the sheet which is rolled about the inner section or leaf $a$ and fastened by suitable means such as the wire wrapping $b'$.

In manufacturing the pipe the joined edges of the thimble are riveted together at one end of the thimble leaving the edges at the other end unriveted to allow the edges to clasp upon one of the leaves of the body of the pipe, the edges $a^3$ $a^4$ of the sheet which forms the thimble being upon opposite sides of the section or thickness $a'$ of the sheet forming the body of the pipe so that the section $a'$ is clasped between the two edges of the sheet which forms the thimble. When all the parts of the sheets of the body and thimbles are in proper position the thimble is securely riveted to the body.

In practice one end of the pipe is provided with a male thimble A and the other end of the pipe is provided with a female thimble A' so that the sections will fit together properly to form a line of pipe. The thimble is applied in the course of manufacture before the wire wrapping, and the wire wrapping is applied so that it compresses the outer section or leaf $a'$ of the sheet to form a shoulder $d$ against the inserted end of the thimble thus to secure the thimble against longitudinal movement with relation to the body of the pipe. This provides against any liability of the rivets $a^2$ stripping when the sections of pipe are forced together in the process of forming the pipe line.

I consider the best plan for uniting the sections in laying pipe line to consist in applying a clamp to the end of the pipe at the union formed by the thimble and the body of the pipe, clamping the male thimble of one section and the female thimble of another section; then forcing the parts together by screw pressure or some other suitable means. Such clamps and means require no illustration here as this method of forming the union between the sections of pipe is well understood in mechanics. The extra strength of the pipe formed by the extra heavy thimble and the union therewith of the convolutions which form the body of the pipe allows the clamps to be applied for this purpose without any danger of injury to the pipe. The thimbles are made of sheet metal of sufficient weight or thickness to withstand the strain necessary to be applied in forming a tight joint.

The sheet which forms the thimble may be of wrought or rolled iron or steel or other suitable sheet metal and is riveted firmly to the body of the pipe and the completed pipe is coated with asphaltic material or some substance which perfectly closes the joints and seams. When the pipe is fully completed it is very strong and can be driven together if it be desired to lay the pipe in that way. The thimbles being embraced between the convolutions of the body effectually prevents the escape of water between the thimble and the body when the coating, not shown, is applied. By forming the thimble in this manner, a slot is thus provided into which one of the folds of the convolute sheet metal pipe is passed, and by this means I am enabled to arrange the thimble between the convolutions of the pipe. Without this slot, it is impossible to arrange the thimble between the convolutions of the sheet metal, and therefore I would broadly claim a convolute sheet metal pipe having at its end a thimble having in its end a slot arranged to receive one of the leaves of the pipe.

Now, having described my invention, what I claim as new, and desire to secure by Letters Patent, is—

1. A pipe formed of convolute sheet metal and having its end provided with a thimble of thicker material than the body of the pipe, such thimble being provided in its end with the slot arranged to receive one of the leaves of such body.

2. A pipe having its body formed of a convolute of sheet metal and having its end formed of a thimble of sheet metal thicker than the sheet metal which forms the body of the pipe, riveted to such body and arranged with its lap embracing one of the leaves of the body.

3. A pipe having a body formed of convolute sheet metal and having a sheet metal thimble seated between the folds of such body and suitable means for securing the folds and the thimble together.

4. A pipe having a body formed of convolute sheet metal and having a sheet metal thimble seated between the folds of such body and having a wire wrapping arranged to compress the outer fold of the body against the inserted end of the thimble.

5. The combination of the body formed of a single sheet of metal comprising two sections provided between said sections with a longitudinally arranged S-shaped fold or lap which forms a seat for the edge of one of the sections, said sheet being rolled into convolute form with the edge of one section of the sheet inserted in the seat formed by the lap, and the outer section of the sheet rolled about the inner section; the thimble of sheet metal of greater thickness than the sheet metal which forms the body of the pipe, said thimble being arranged encircling the inner section of the sheet which forms the body of the pipe and having its lap embracing the inner portion of the outer section of such sheet; means for securing the thimble to the body of the pipe, and suitable means for securing the pipe in shape.

CHARLES S. HAMLIN.

Witnesses:
JAMES R. TOWNSEND,
ALFRED I. TOWNSEND.